США009141625B1

(12) United States Patent
Thornewell et al.

(10) Patent No.: US 9,141,625 B1
(45) Date of Patent: Sep. 22, 2015

(54) METHODS FOR PRESERVING FLOW STATE DURING VIRTUAL MACHINE MIGRATION AND DEVICES THEREOF

(75) Inventors: Peter M. Thornewell, Seattle, WA (US); Songbo Zheng, Issaquah, WA (US); Nojan Moshiri, Seattle, WA (US); David Kushi, San Francisco, CA (US); Charles Cano, New York, NY (US)

(73) Assignee: F5 Networks, Inc., Seattle, WA (US)

( * ) Notice: Subject to any disclaimer, the term of this patent is extended or adjusted under 35 U.S.C. 154(b) by 93 days.

(21) Appl. No.: 13/166,624

(22) Filed: Jun. 22, 2011

Related U.S. Application Data

(60) Provisional application No. 61/357,425, filed on Jun. 22, 2010.

(51) Int. Cl.
 G06F 15/173 (2006.01)
 G06F 17/30 (2006.01)
 G06F 9/48 (2006.01)

(52) U.S. Cl.
 CPC ........ G06F 17/30079 (2013.01); G06F 9/4856 (2013.01)

(58) Field of Classification Search
 CPC .................................................. G06F 17/30079
 USPC .................................................. 709/223, 226
 See application file for complete search history.

(56) References Cited

U.S. PATENT DOCUMENTS

| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,299,312 A | 3/1994 | Rocco, Jr. |
| 5,327,529 A | 7/1994 | Fults et al. |
| 5,367,635 A | 11/1994 | Bauer et al. |

(Continued)

FOREIGN PATENT DOCUMENTS

| EP | 0744850 A2 | 11/1996 |
| WO | WO 91/14326 | 9/1991 |

(Continued)

OTHER PUBLICATIONS

MacVittie, Lori, "Message-Based Load Balancing," Technical Brief, Jan. 2010, pp. 1-9, F5 Networks, Inc.

(Continued)

*Primary Examiner* — Joe Chacko
(74) *Attorney, Agent, or Firm* — LeClairRyan, a Professional Corporation

(57) ABSTRACT

Methods, computer-readable media, and apparatuses for network flow state preservation include migration of at least one application hosted on a first server device to a second server device coupled to a second traffic management device is detected at a first traffic management device. At least a portion of connection state information associated with a network connection between at least one client device and the application is communicated by the first traffic management device to the second traffic management device via a communication channel between the first and second traffic management devices. The application is provided by the first traffic management device to the at least one client device during the migration based upon the connection state information.

29 Claims, 8 Drawing Sheets

(56) References Cited

U.S. PATENT DOCUMENTS

| | | |
|---|---|---|
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,694,517 B1 | 2/2004 | James et al. |
| 6,708,187 B1 | 3/2004 | Shanumgam et al. |
| 6,718,380 B1 | 4/2004 | Mohaban et al. |
| 6,742,045 B1 | 5/2004 | Jordan et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,133,944 B2 | 11/2006 | Song et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,295,827 B2 | 11/2007 | Liu et al. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,398,552 B2 | 7/2008 | Pardee et al. |
| 7,433,962 B2 | 10/2008 | Janssen et al. |
| 7,454,480 B2 | 11/2008 | Labio et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,624,424 B2 | 11/2009 | Morita et al. |
| 7,644,137 B2 | 1/2010 | Bozak et al. |
| 7,668,166 B1 | 2/2010 | Rekhter et al. |
| 7,724,657 B2 | 5/2010 | Rao et al. |
| 7,725,093 B2 | 5/2010 | Sengupta et al. |
| 7,778,187 B2 | 8/2010 | Chaturvedi et al. |
| 7,801,978 B1 | 9/2010 | Susai et al. |
| 7,831,662 B2 | 11/2010 | Clark et al. |
| 7,877,511 B1 * | 1/2011 | Berger et al. .................. 709/242 |
| 7,908,314 B2 | 3/2011 | Yamaguchi et al. |
| 7,925,908 B2 | 4/2011 | Kim |
| 7,933,946 B2 | 4/2011 | Livshits et al. |
| 7,945,908 B1 | 5/2011 | Waldspurger et al. |
| 7,984,141 B2 | 7/2011 | Gupta et al. |
| 8,117,244 B2 * | 2/2012 | Marinov et al. ................ 707/827 |
| 8,130,650 B2 | 3/2012 | Allen, Jr. et al. |
| 8,180,747 B2 * | 5/2012 | Marinkovic et al. ........... 707/704 |
| 8,199,757 B2 | 6/2012 | Pani et al. |
| 8,276,140 B1 * | 9/2012 | Beda et al. ........................ 718/1 |
| 8,351,333 B2 | 1/2013 | Rao et al. |
| 8,380,854 B2 | 2/2013 | Szabo |
| 8,396,836 B1 * | 3/2013 | Ferguson et al. .............. 707/652 |
| 8,447,871 B1 | 5/2013 | Szabo |

(56) References Cited

U.S. PATENT DOCUMENTS

| | | | |
|---|---|---|---|
| 8,464,265 B2 | 6/2013 | Worley | |
| 8,606,921 B2 | 12/2013 | Vasquez et al. | |
| 8,615,022 B2 | 12/2013 | Harrison et al. | |
| 8,665,868 B2 | 3/2014 | Kay | |
| 8,701,179 B1 | 4/2014 | Penno et al. | |
| 8,788,665 B2 | 7/2014 | Gilde et al. | |
| 8,804,504 B1 | 8/2014 | Chen | |
| 8,830,874 B2 | 9/2014 | Cho et al. | |
| 2001/0009554 A1 | 7/2001 | Katseff et al. | |
| 2001/0023442 A1 | 9/2001 | Masters | |
| 2002/0040400 A1* | 4/2002 | Masters | 709/228 |
| 2002/0049842 A1 | 4/2002 | Huetsch et al. | |
| 2002/0059428 A1 | 5/2002 | Susai et al. | |
| 2002/0083067 A1 | 6/2002 | Tamayo et al. | |
| 2002/0138615 A1 | 9/2002 | Schmeling | |
| 2002/0161913 A1 | 10/2002 | Gonzalez et al. | |
| 2002/0194342 A1 | 12/2002 | Lu et al. | |
| 2002/0198993 A1 | 12/2002 | Cudd et al. | |
| 2003/0046291 A1 | 3/2003 | Fascenda | |
| 2003/0065951 A1 | 4/2003 | Igeta et al. | |
| 2003/0069918 A1 | 4/2003 | Lu et al. | |
| 2003/0069974 A1 | 4/2003 | Lu et al. | |
| 2003/0070069 A1 | 4/2003 | Belapurkar et al. | |
| 2003/0086415 A1 | 5/2003 | Bernhard et al. | |
| 2003/0105983 A1 | 6/2003 | Brakmo et al. | |
| 2003/0108052 A1 | 6/2003 | Inoue et al. | |
| 2003/0128708 A1 | 7/2003 | Inoue et al. | |
| 2003/0145062 A1 | 7/2003 | Sharma et al. | |
| 2003/0145233 A1 | 7/2003 | Poletto et al. | |
| 2003/0163576 A1 | 8/2003 | Janssen et al. | |
| 2003/0225485 A1 | 12/2003 | Fritz et al. | |
| 2004/0003287 A1 | 1/2004 | Zissimopoulos et al. | |
| 2004/0072569 A1 | 4/2004 | Omae et al. | |
| 2004/0103283 A1 | 5/2004 | Hornak | |
| 2004/0111523 A1 | 6/2004 | Hall et al. | |
| 2004/0111621 A1 | 6/2004 | Himberger et al. | |
| 2004/0117493 A1 | 6/2004 | Bazot et al. | |
| 2004/0151186 A1 | 8/2004 | Akama | |
| 2004/0192312 A1 | 9/2004 | Li et al. | |
| 2004/0264472 A1 | 12/2004 | Oliver et al. | |
| 2004/0264481 A1 | 12/2004 | Darling et al. | |
| 2004/0267920 A1 | 12/2004 | Hydrie et al. | |
| 2004/0267948 A1 | 12/2004 | Oliver et al. | |
| 2004/0268358 A1 | 12/2004 | Darling et al. | |
| 2005/0004887 A1 | 1/2005 | Igakura et al. | |
| 2005/0021736 A1 | 1/2005 | Carusi et al. | |
| 2005/0027869 A1 | 2/2005 | Johnson | |
| 2005/0044213 A1 | 2/2005 | Kobayashi et al. | |
| 2005/0052440 A1 | 3/2005 | Kim et al. | |
| 2005/0055435 A1 | 3/2005 | Gbadegesin et al. | |
| 2005/0060590 A1* | 3/2005 | Bradley et al. | 713/320 |
| 2005/0078604 A1 | 4/2005 | Yim | |
| 2005/0122977 A1 | 6/2005 | Lieberman | |
| 2005/0154837 A1 | 7/2005 | Keohane et al. | |
| 2005/0187866 A1 | 8/2005 | Lee | |
| 2005/0188220 A1 | 8/2005 | Nilsson et al. | |
| 2005/0198310 A1 | 9/2005 | Kim et al. | |
| 2005/0251802 A1* | 11/2005 | Bozek et al. | 718/1 |
| 2005/0262238 A1 | 11/2005 | Reeves et al. | |
| 2006/0031520 A1 | 2/2006 | Bedekar et al. | |
| 2006/0059267 A1 | 3/2006 | Cugi et al. | |
| 2006/0077902 A1 | 4/2006 | Kannan et al. | |
| 2006/0112176 A1 | 5/2006 | Liu et al. | |
| 2006/0112272 A1 | 5/2006 | Morioka et al. | |
| 2006/0129684 A1 | 6/2006 | Datta | |
| 2006/0135198 A1 | 6/2006 | Lee | |
| 2006/0156416 A1 | 7/2006 | Huotari et al. | |
| 2006/0161577 A1 | 7/2006 | Kulkarni et al. | |
| 2006/0171365 A1 | 8/2006 | Borella | |
| 2006/0209853 A1 | 9/2006 | Hidaka et al. | |
| 2006/0230148 A1 | 10/2006 | Forecast et al. | |
| 2006/0233106 A1 | 10/2006 | Achlioptas et al. | |
| 2006/0242300 A1 | 10/2006 | Yumoto et al. | |
| 2007/0006293 A1 | 1/2007 | Balakrishnan et al. | |
| 2007/0016662 A1 | 1/2007 | Desai et al. | |
| 2007/0058670 A1 | 3/2007 | Konduru et al. | |
| 2007/0064661 A1 | 3/2007 | Sood et al. | |
| 2007/0083646 A1 | 4/2007 | Miller et al. | |
| 2007/0088822 A1 | 4/2007 | Coile et al. | |
| 2007/0106796 A1 | 5/2007 | Kudo et al. | |
| 2007/0107048 A1 | 5/2007 | Halls et al. | |
| 2007/0118879 A1 | 5/2007 | Yeun | |
| 2007/0174491 A1 | 7/2007 | Still et al. | |
| 2007/0220598 A1 | 9/2007 | Salowey et al. | |
| 2007/0233809 A1 | 10/2007 | Brownell et al. | |
| 2007/0297410 A1 | 12/2007 | Yoon et al. | |
| 2007/0297551 A1 | 12/2007 | Choi | |
| 2008/0025297 A1 | 1/2008 | Kashyap | |
| 2008/0034136 A1 | 2/2008 | Ulenas | |
| 2008/0072303 A1 | 3/2008 | Syed | |
| 2008/0120370 A1 | 5/2008 | Chan et al. | |
| 2008/0133518 A1 | 6/2008 | Kapoor et al. | |
| 2008/0134311 A1 | 6/2008 | Medvinsky et al. | |
| 2008/0148340 A1 | 6/2008 | Powell et al. | |
| 2008/0159145 A1 | 7/2008 | Muthukrishnan et al. | |
| 2008/0178278 A1 | 7/2008 | Grinstein et al. | |
| 2008/0201599 A1 | 8/2008 | Ferraiolo et al. | |
| 2008/0205613 A1 | 8/2008 | Lopez | |
| 2008/0222646 A1 | 9/2008 | Sigal et al. | |
| 2008/0225710 A1 | 9/2008 | Raja et al. | |
| 2008/0229415 A1 | 9/2008 | Kapoor et al. | |
| 2008/0253395 A1 | 10/2008 | Pandya | |
| 2008/0256224 A1 | 10/2008 | Kaji et al. | |
| 2008/0270564 A1* | 10/2008 | Rangegowda et al. | 709/212 |
| 2008/0288661 A1 | 11/2008 | Galles | |
| 2008/0301760 A1 | 12/2008 | Lim | |
| 2009/0028337 A1 | 1/2009 | Balabine et al. | |
| 2009/0049230 A1 | 2/2009 | Pandya | |
| 2009/0049438 A1* | 2/2009 | Draper et al. | 717/168 |
| 2009/0070617 A1 | 3/2009 | Arimilli et al. | |
| 2009/0077619 A1 | 3/2009 | Boyce | |
| 2009/0094610 A1 | 4/2009 | Sukirya | |
| 2009/0106409 A1* | 4/2009 | Murata | 709/223 |
| 2009/0119504 A1 | 5/2009 | van Os et al. | |
| 2009/0125496 A1 | 5/2009 | Wexler et al. | |
| 2009/0125532 A1 | 5/2009 | Wexler et al. | |
| 2009/0125625 A1 | 5/2009 | Shim et al. | |
| 2009/0138749 A1 | 5/2009 | Moll et al. | |
| 2009/0141891 A1 | 6/2009 | Boyen et al. | |
| 2009/0157678 A1 | 6/2009 | Turk | |
| 2009/0196282 A1 | 8/2009 | Fellman et al. | |
| 2009/0228956 A1 | 9/2009 | He et al. | |
| 2009/0287935 A1 | 11/2009 | Aull et al. | |
| 2009/0296624 A1 | 12/2009 | Ryu et al. | |
| 2009/0300407 A1 | 12/2009 | Kamath et al. | |
| 2010/0011434 A1 | 1/2010 | Kay | |
| 2010/0017846 A1 | 1/2010 | Huang et al. | |
| 2010/0023582 A1 | 1/2010 | Pedersen et al. | |
| 2010/0042869 A1* | 2/2010 | Szabo et al. | 714/4 |
| 2010/0071048 A1 | 3/2010 | Novak et al. | |
| 2010/0103837 A1* | 4/2010 | Jungck et al. | 370/252 |
| 2010/0115236 A1 | 5/2010 | Bataineh et al. | |
| 2010/0122091 A1 | 5/2010 | Huang et al. | |
| 2010/0150154 A1 | 6/2010 | Viger et al. | |
| 2010/0165877 A1* | 7/2010 | Shukla et al. | 370/254 |
| 2010/0242092 A1 | 9/2010 | Harris et al. | |
| 2010/0251330 A1 | 9/2010 | Kroeselberg et al. | |
| 2010/0278733 A1 | 11/2010 | Nakayama et al. | |
| 2010/0287548 A1* | 11/2010 | Zhou et al. | 718/1 |
| 2010/0322250 A1* | 12/2010 | Shetty et al. | 370/395.32 |
| 2010/0325277 A1 | 12/2010 | Muthiah et al. | |
| 2011/0040889 A1 | 2/2011 | Garrett et al. | |
| 2011/0047620 A1 | 2/2011 | Mahaffey et al. | |
| 2011/0066718 A1 | 3/2011 | Susai et al. | |
| 2011/0153822 A1 | 6/2011 | Rajan et al. | |
| 2011/0154443 A1 | 6/2011 | Thakur et al. | |
| 2011/0173295 A1 | 7/2011 | Bakke et al. | |
| 2011/0184733 A1 | 7/2011 | Yu et al. | |
| 2011/0246800 A1 | 10/2011 | Accpadi et al. | |
| 2011/0273984 A1 | 11/2011 | Hsu et al. | |
| 2011/0282997 A1 | 11/2011 | Prince et al. | |
| 2011/0321122 A1 | 12/2011 | Mwangi et al. | |
| 2012/0016994 A1 | 1/2012 | Nakamura et al. | |
| 2012/0039341 A1 | 2/2012 | Latif et al. | |

(56) References Cited

U.S. PATENT DOCUMENTS

| | | |
|---|---|---|
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0101952 A1 | 4/2012 | Raleigh et al. |
| 2012/0311153 A1 | 12/2012 | Morgan |
| 2012/0317266 A1 | 12/2012 | Abbott |
| 2013/0336122 A1 | 12/2013 | Baruah et al. |
| 2014/0025823 A1 | 1/2014 | Szabo et al. |
| 2014/0040478 A1 | 2/2014 | Hsu et al. |
| 2014/0095661 A1 | 4/2014 | Knowles et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

Schaefer, Ken, "IIS and Kerberos Part 5—Protocol Transition, Constrained Delegation, S4U2S and S402P," Jul. 18, 2007, 21 pages, http://www.adopenstatic.com/cs/blogs/ken/archive/2007/07/19/8460.aspx.

"Servlet/Applet/HTML authentication process with single sign-on," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Williams et al., "Forwarding Authentication," The Ultimate Windows Server 2003 System Administrator's Guide, 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http;//technet.microsoft.com/en-us/library/cc738207, Microsoft Corporation.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

International Search Report and the Written Opinion, for International Patent Application No. PCT/US2013/026615, Date of Mailing: Jul. 4, 2013.

F5 Networks Inc., "Configuration Guide for Local Traffic Management," F5 Networks Inc., Jan. 2006, version 9.2.2, 406 pgs.

\* cited by examiner

METHODS FOR PRESERVING FLOW STATE DURING VIRTUAL MACHINE MIGRATION AND DEVICES THEREOF

This application claims the benefit of U.S. Provisional Patent Application No. 61/357,425, filed Jun. 22, 2010, which is hereby incorporated by reference in its entirety.

FIELD

This technology generally relates to managing network traffic and, more particularly, to methods for preserving a flow state during migration of a virtual machine application from one physical server to another physical server and non-disruptively providing services to requesting client devices from a secondary data site during and after the migration and devices thereof.

BACKGROUND

Migration of a virtual machine application from one server in a first data center to another server in a second datacenter, results in disruption of existing traffic flows (e.g., TCP connections) and connection states that are not preserved during this transition. This results in degradation of network performance and inconsistent provisioning of services to requesting client devices.

SUMMARY

An exemplary method for preserving network flow includes detecting at a first traffic management device a migration of at least one application hosted on a first server device to a second server device coupled to a second traffic management device. The first traffic management device communicates at least a portion of connection state information associated with a network connection between at least one client device and the application to the second traffic management device via a communication channel between the first and the second traffic management devices. The first traffic management device provides the application to the client device during the migration based upon the connection state information.

An exemplary non-transitory computer readable medium having stored thereon instructions for preserving network flow state comprising machine executable code which when executed by at least one processor, causes the processor to perform steps including detecting at a first traffic management device a migration of at least one application hosted on a first server device to a second server device coupled to a second traffic management device. At least a portion of a connection state information associated with a network connection between at least one client device and the application is communicated to the second traffic management device via a communication channel between the first and the second traffic management devices. The application is provided to the at least one client device during the migration based upon the connection state information.

An exemplary traffic management device includes a memory coupled to the one or more processors and a network interface unit coupled to the one or more processors and the memory via at least one bus. At least one of the network interface unit configured to implement and the one or more processors configured to execute programmed instructions stored in the memory are configured to detect at a first traffic management device a migration of at least one application hosted on a first server device to a second server device coupled to a second traffic management device. At least a portion of connection state information associated with a network connection between at least one client device and the application is communicated to the second traffic management device via a communication channel between the first and the second traffic management devices. The application is provided to the at least one client device during the migration based upon the connection state information.

This technology provides a number of advantages including providing improved methods, computer readable media, and devices that effectively preserve a flow state during migration of a virtual machine application from one physical server to another physical server and non-disruptively provide services to requesting client devices from a secondary data site during and after the migration. With this technology, transparent long-distance live migration of applications between data centers and clouds is now possible.

DETAILED DESCRIPTION

Figure 1A:
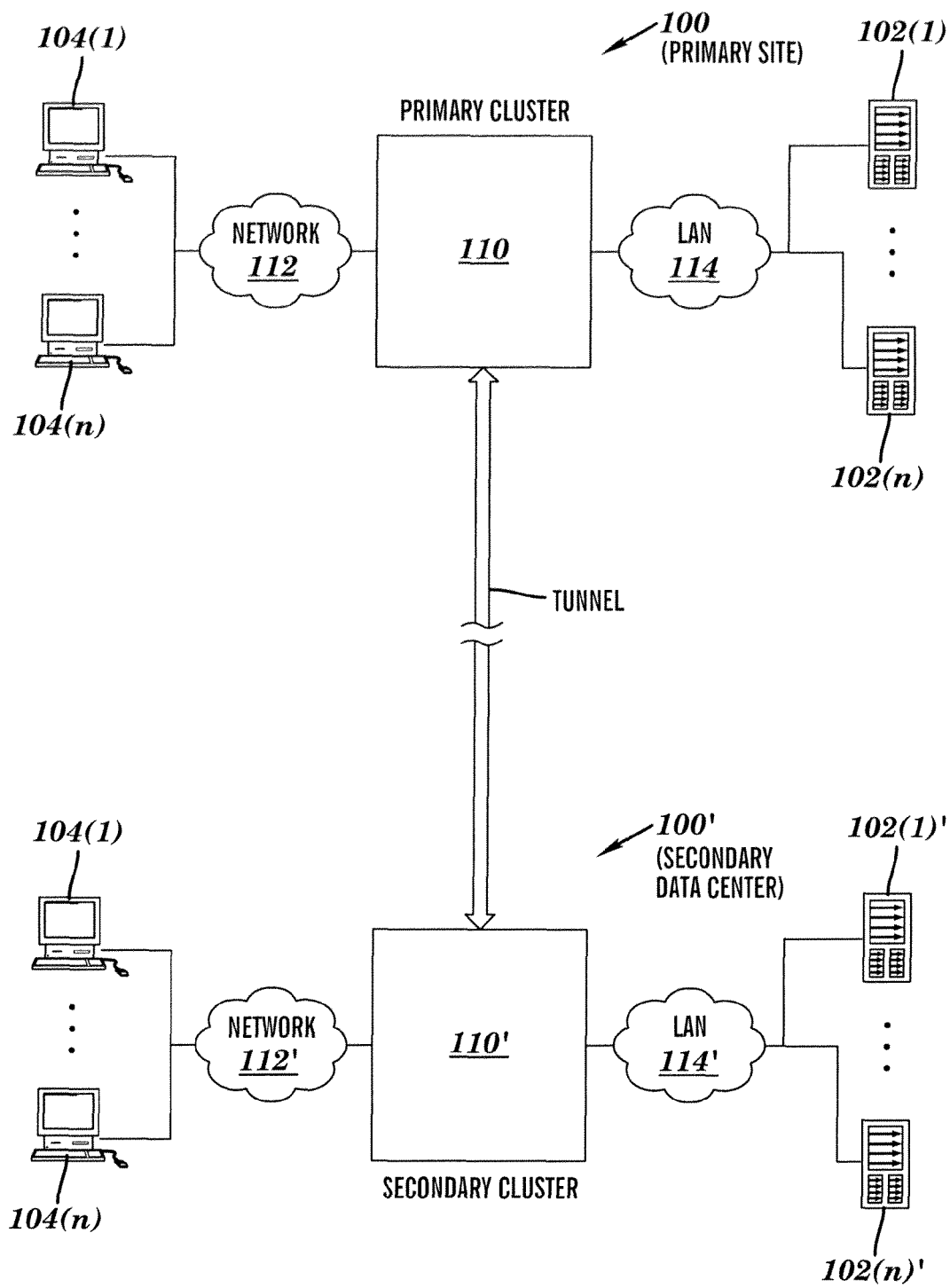
FIG. 1A is a block diagram of an exemplary environment involving two datacenter sites between which a migration of a virtual machine application takes place and flow state is preserved during the migration.

An exemplary system for preserving flow state during migration of network applications from one datacenter site 100 to another datacenter site 100' using a primary cluster traffic management device 110 communicating over a tunnel/channel with a secondary cluster traffic management device 110' is illustrated in FIG. 1A, where both primary datacenter site 100 and secondary datacenter site 100' are heterogeneous in terms of network components, although the examples disclosed herein may be utilized in homogeneous network storage systems with one or more storage devices. Additionally, although the discussion herein is with respect to migration of virtual machine application(s) between primary datacenter site 100 and secondary datacenter site 100', one of ordinary skill in the art, after reading this disclosure, may contemplate extension of this technology for migration of virtual machine applications between more than two or less than two datacenter sites. The primary datacenter site 100 includes a plurality of client computing devices 104(1)-104(n) communicating with a plurality of servers 102(1)-102(n) over a network 112 and a local area network (LAN) 114 via a traffic management device 110. According to various examples disclosed herein, datacenter site 100 is a heterogeneous, multi-protocol, multi-vendor, and multi-platform environment where file operations are carried out between client computing devices 104(1)-104(n) and servers 102(1)-102(n). It is to be noted that although the description below substantially refers to datacenter site 100, similar description also equally applies to secondary data recovery file virtualization site 100' and various components therein. For example, secondary datacenter site 100' includes traffic management device 110', and secondary datacenter site 100' is used to non-disruptively provide services to client computing devices 104(1)-104(n) during a migration of a virtual machine application from the first datacenter site 100 to a second datacenter site 100'.

Traffic management devices 110 and 110' of primary datacenter site 100 and second datacenter site 100', respectively, communicate with each other over a communication link, as described in more detail below, and as shown in FIG. 1A. The traffic management devices 110 and 110' can be used to implement a communications channel to exchange network state connection information packets (e.g., TCP keep-alive packets) during the migration of a virtual machine application from a server in primary datacenter 100 to a server in second datacenter 100'.

As shown in the exemplary environment of datacenter sites 100 and 100' depicted in FIG. 1A, the traffic management device 110 can be interposed between the network 112 and the servers 102(1)-102(n) in LAN 114 as shown in FIG. 1A. Again, the network system 100 could be arranged in other manners with other numbers and types of devices. Also, the traffic management device 110 is coupled to network 112 by one or more network communication links and intermediate network devices, such as routers, switches, gateways, hubs and other devices (not shown). It should be understood that the devices and the particular configuration shown in FIG. 1A are provided for exemplary purposes only and thus are not limiting.

Generally, the traffic management device 110 in the primary cluster at the primary network site/datacenter and traffic management device 110' in the secondary cluster at the secondary network site/datacenter manage network communications, which may include one or more client requests and server responses, from/to the network 112 between the client devices 104(1)-104(n) and one or more of the servers 102(1)-102(n) in LAN 114 in these examples. These requests may be destined for one or more servers 102(1)-102(n), and, as alluded to earlier, may take the form of one or more IP data packets (or other types of network packets) originating from the network 112, passing through one or more intermediate network devices and/or intermediate networks, until ultimately reaching the traffic management device 110, for example. In any case, the traffic management device 110 may manage the network communications by performing several network traffic management related functions involving the communications, e.g., load balancing, access control, VPN hosting, network traffic acceleration, and preserving flow state during migration of one or more virtual machine applications in accordance with the processes described further below.

Figure 1B:
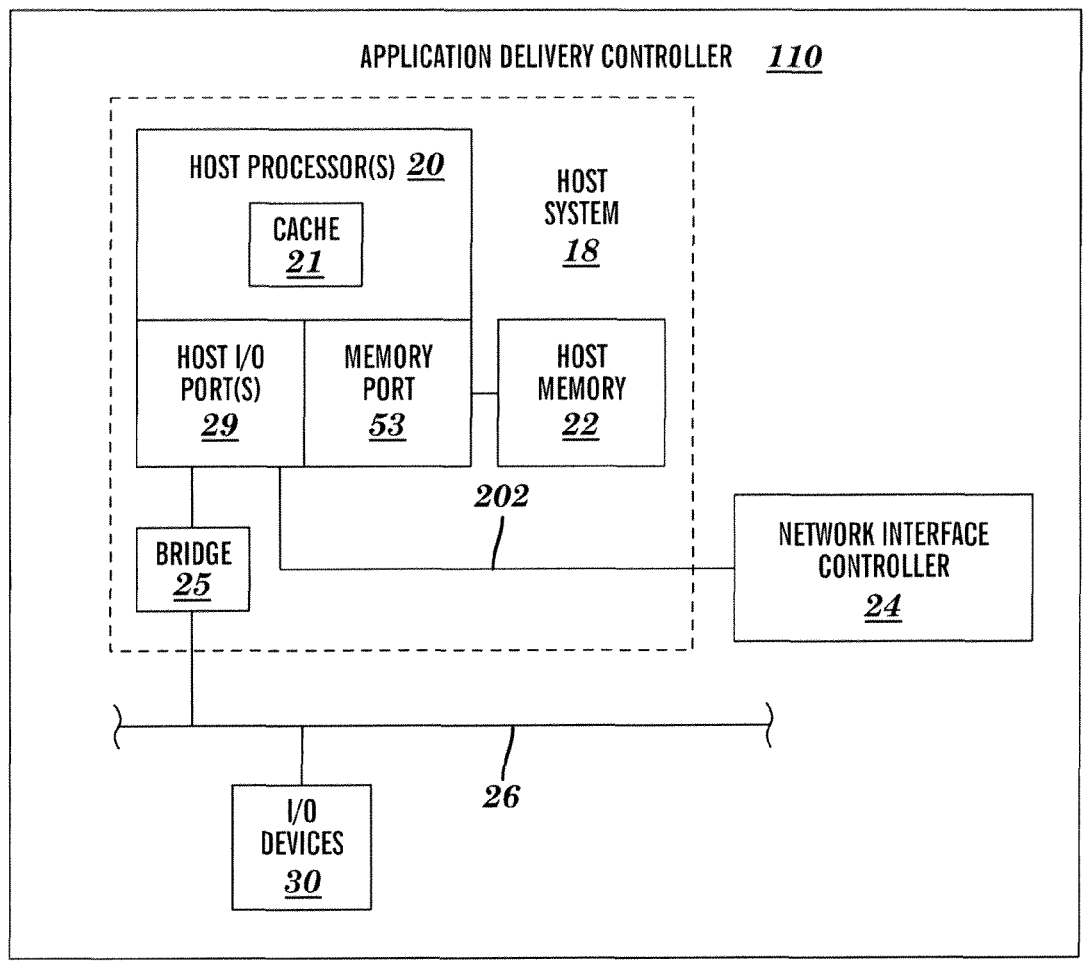
FIG. 1B is a block diagram of an exemplary application controller device at each of the primary and the secondary datacenter sites of FIG. 1A.

FIG. 1B illustrates an exemplary traffic management device 110. Included within the traffic management device 110 is a system bus 26 (also referred to as bus 26) that communicates with a host system 18 via a bridge 25 and with an I/O device 30. In this example, a single I/O device 30 is shown to represent any number of I/O devices connected to bus 26. In one example, bridge 25 is in further communication with a host processor 20 via host I/O ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately). Although FIG. 1B is being described with respect to the traffic management device 110 at datacenter site 100, the discussion herein is equally applicable to the traffic management device 110' at the datacenter site 100'.

In one example, traffic management device 110 can include the host processor 20 characterized by anyone of the following component configurations: computer readable medium and logic circuits that respond to and process instructions fetched from the host memory 22; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Exemplary traffic management device 110 includes the host processor 20 that communicates with cache memory 21 via a secondary bus also known as a backside bus, while another example of the traffic management device 110 includes the host processor 20 that communicates with cache memory via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other examples of the traffic management device 110 include I/O device 30 that is a video display (not shown separately) that communicates with the host processor 20 via an Advanced Graphics Port (AGP).

Still other versions of the traffic management device 110 include host processor 20 connected to an I/O device 30 via any one of the following connections: HyperTransport, Rapid I/O, or InfiniBand. Further examples of the traffic management device 110 include a communication connection where the host processor 20 communicates with one I/O device 30 using a local interconnect bus and with a second I/O device (not shown separately) using a direct connection. Included within some examples of the traffic management device 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Further examples include a host processor 20 that can access the host memory 22 via one of either: system bus 26; memory port 53; or any other connection, bus, or port that allows the host processor 20 to access host memory 22.

One example of the traffic management device 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive, or any other device suitable for installing applications or software. Applications can, in some examples, include a client agent, or any portion of a client agent. The traffic management device 110 may further include a storage device (not shown separately) that can be either one or more hard disk drives, or one or more redundant arrays of independent disks; where the storage device is configured to store an operating system, software, programs applications, or at least a portion of the client agent. A further example of the traffic management device 110 includes an installation device that is used as the storage device.

Furthermore, the traffic management device 110 includes network interface controller 24 to communicate with a Local Area Network (LAN), Wide Area Network (WAN), or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the traffic management device 110 includes network interface controller 24 able to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise one or more of: a built-in network adapter; a network interface card; a PCMCIA network card; a card bus network adapter; a wireless network adapter; a USB network adapter; a modem; or any other device suitable for interfacing the traffic management device 110 to a network capable of communicating and performing the methods and systems described herein.

In various examples, the traffic management device 110 can include one or more of the following I/O devices 30: a keyboard; a pointing device; a mouse; a gesture based remote control device; an audio device; track pads; an optical pen; trackballs; microphones; drawing tablets; video displays; speakers; inkjet printers; laser printers; and dye sublimation printers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

Networks 112 and 112' can provide responses and requests according to the HTTP-based application request for comments (RFC) protocol or the Common Internet File System (CIFS) or network file system (NFS) protocol in this example, but the principles discussed herein are not limited to these examples and can include other application protocols. For clarity and brevity, in FIG. 1A two servers 102(1) and 102(n) are shown, but it should be understood that any number of server devices can use the exemplary traffic management devices 110 and 110'. Likewise, two client computing devices 104(1) and 104(n) are shown in FIG. 1A, but any number of client devices can also use the exemplary traffic management devices 110 and 110' as well. The ellipses and the designation "n" in FIG. 1A denote an unlimited number of server devices and client devices, respectively.

Servers 102(1)-102(n) and 102(1)'-102(n)' comprise one or more server computing machines capable of performing operations, for example, storing files and data related to a connection state of the file system, operating one or more Web-based or virtual machine applications that may be accessed by network devices in the networks 112 and 112', such as client computing devices 104(1)-104(n), via traffic management devices 110 and 110', and may provide other data representing requested resources, such as particular Web page(s), image(s) of physical objects, and any other objects, responsive to the requests, although the servers 102(1)-102(n) and 102(1)'-102(n)' may perform other tasks and provide other types of resources. It should be noted that although the discussion below refers to servers 102(1)-102(n), similar discussion can easily be applied to servers 102(1)'-102(n)'. It should also be noted that one or more of the servers 102(1)-102(n) may be a cluster of servers managed by a network traffic management device such as traffic management devices 110 and 110'. Servers 102(1)-102(n) can be heterogeneous file storage devices or systems provided by independent vendors. Further, according to various examples, servers 102(1)-102(n) can be used to form a tiered storage arrangement where high priority data and/or frequently accessed data is stored in a fast, more expensive storage device, whereas low priority and/or relatively less accessed data can be stored in a slow, less expensive storage device.

The client computing devices 104(1)-104(n) in this example can request data over one or more virtual machine applications associated with one or more volumes in the servers 102(1)-102(n) by sending a request to the traffic management device 110. In addition, client computing devices 104(1)-104(n) can be used for other functions, for example, to run interface applications such as virtual machines that can provide an interface to make requests for and send data to different virtual machine-based applications via the network 112 and/or 112'. A series of applications can run on the servers 102(1)-102(n) that allow the transmission of data, for example, files, configuration data, cookies, descriptor files, namespace data, and other file system data, that can be requested by the client computing devices 104(1)-104(n). The servers 102(1)-102(n) can provide data or receive data in response to requests directed toward the respective applications on the servers 102(1)-102(n) from the client computing devices 104(1)-104(n). As per the TCP, packets can be sent to the servers 102(1)-102(n) from the requesting client computing devices 104(1)-104(n) to send data. It is to be understood that the servers 102(1)-102(n) can be hardware and can represent a system with multiple servers, which can include internal or external networks. Alternatively, servers 102(1)-102(n) may be software and can be any version of Microsoft® IIS servers or Apache® servers, although other types of servers can be used. Further, additional servers can be coupled to the network 112 and many different types of applications can be available on servers coupled to the network 112.

Generally, the client devices such as the client computing devices 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run Web browsers that can provide an interface to make requests to different Web server-based applications via the network 112. A series of Web-based applications can run on servers 102(1)-102(n) that allow the transmission of data that is requested by the client computing devices 104(1)-104(n). The client computing devices 104(1)-104(n) can be further configured to engage in a communication with the file virtualization clusters 110 and 110' and/or the servers 102(1)-102(n) using mechanisms such as Secure Sockets Layer (SSL), Internet Protocol Security (IPSec), Tunnel Layer Security (TLS), and the like.

In this example, the network 112 comprises a publicly accessible network, for example, the Internet, which includes client computing devices 104(1)-104(n), although the network 112 may comprise other types of private and public networks that include other devices. It is to be noted that discussion below applies equally to network 112', and in some examples networks 112 and 112's may overlap or even be substantially identical. Communications, such as requests from client computing devices 104(1)-104(n) and responses from servers 102(1)-102(n), take place over the network 112 according to standard network protocols, such as the HTTP and TCP/IP protocols in this example, but the principles discussed herein are not limited to this example and can include other protocols. Further, the networks 112 and 112' can include Local Area Networks (LANs), Wide Area Networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the networks 112 and 112' include any communication medium and method by which data may travel between client computing devices 104(1)-104(n), servers 102(1)-102(n) and traffic management device 110, and these examples are provided by way of example only.

LANs 114 and 114' can include a private local area network that includes the traffic management devices 110 and 110' coupled to the one or more servers 102(1)-102(n), although the LANs 114 and 114' may comprise other types of private and public networks with other devices. Networks, including local area networks, besides being understood by those skilled in the relevant arts, have already been generally described above in connection with network 112, and thus will not be described further here.

Each of the servers 102(1)-102(n) and client computing devices 104(1)-104(n) can include a central processing unit (CPU), controller or processor, a memory, and an interface system which are coupled together by a bus or other link, although other numbers and types of each of the components and other configurations and locations for the components can be used. Since these devices are well known to those skilled in the relevant art(s), they will not be described in further detail herein.

In addition, two or more computing systems or devices can be substituted for any one of the systems in the network system of datacenter site 100. Accordingly, principles and advantages of cloud computing or distributed processing, such as redundancy, replication, and the like, also can be implemented, as appropriate, to increase the robustness and performance of the devices and systems of the network system of datacenter site 100. The network systems of datacenter sites 100 and 100' can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

This technology may also be embodied as a computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Cloud computing has become an important technology to consider for organizations that are looking to optimize their information technology (IT) operations and reduce operating costs. Until now, leveraging the cloud involved either setting up and running applications in the cloud and managing them long-term off-premise, or running services as a one-time event. Migrating existing services, applications, and virtual machines to the cloud presented immense networking complexities, and, if performed outside a local data center, was a non-trivial challenge. Moving live services without user interruption was virtually impossible. Solutions described herein overcome these limitations and enable enterprise customers to migrate application services between clouds without user impact.

Live virtual machine (VM) migration—moving a VM from one physical server to another while the machine is running and processing transactions—has been one of the core technologies propelling virtualization's mass adoption in the data center. Live migration enables a more dynamic and agile environment as virtual systems flow between hardware devices based on usage, consumption, availability, and so on. Until recently, however, even this advanced technology was generally relegated to use within a local data center, staying confined to one physical network.

The cloud migration solution moves migration technology (e.g., VMware's VMotion™) from the binds of the local data center and enables live migration of both VMs and the back-end storage across the WAN between data centers and clouds. A workflow that automates the majority of the migration, making it possible to execute these migrations with minimal manual configuration is disclosed herein.

Live Migration Basics

Live migration technology (e.g., VMware's VMotion™) moves running virtual machines from one physical server to another. During a migration event, active memory and CPU running state (which combined include the current state of the network and any applications running on the VM) may be transferred between physical systems as needed based on resource constraint, disaster recovery, or functional changes (such as bringing down a physical server). The storage backend associated with that virtual machine—the virtual machine disk (VMDK) and configuration files located on the storage network—may also be migrated between storage networks (e.g., via VMware Storage VMotion). The difference between VMotion and Storage VMotion is that VMotion simply moves a VM from one host to another, but keeps the storage location of the VM the same. Storage VMotion changes the storage location of the VM while it is running and moves it to another datastore on the same host, but the VM remains on the same host. The VM's data files can be moved to any datastore on the host which includes local and shared storage.

One of the primary design considerations for such live migration technology is network topology. During a migration, a snapshot of the running systems is transferred from one server to another. Since the running state of a system is a "moment in time" snapshot, there is no way to change anything in the running state, including the IP address of the virtual machine or any other network settings.

For the VM to resume operations and keep running on the new server, the destination network must be exactly the same as the original network housing the VM, as must the network configuration of the VM itself. The virtual machine and physical server network configurations include the IP address of the VM, the IP network settings such as subnet mask and gateway address, and virtual LAN (VLAN) configurations on the virtual motion server(s) (e.g., VMware ESX™). The VM must stay within the same broadcast domain in order for the virtual network to resume without application data loss.

Design Factors: Long Distance Migration

Beyond local network topology issues, one of the common questions when deploying migration technology (e.g., VMware's VMotion™) as part of a cloud or high availability/disaster recovery (HA/DR) scenario has been "Can I move virtual machines between data centers?" Some of the challenges with long distance migration are the WAN bandwidth, latency, and packet loss limitations that are outside the control of most IT organizations. Many applications, including VMotion live migration, are susceptible to network issues across the WAN that can be exacerbated by distance and network quality. Although not as time-sensitive as VM live migration, Storage VMotion can also suffer from latency issues over the WAN. If the conditions are bad enough, attempted VMotion events will simply fail.

Other challenges with external data center live migration events include managing user connections and application data during the migration, and IP management and reclamation. In a LAN migration, user connections are moved from one physical switch port to another. The VM and active user connections never leave their configured network nor is there a need to manage or change the VM IP address because that IP address stays within the local network. With a long distance or cloud VMotion move, however, the VM must traverse multiple networks without losing any user or application state information. The user connections are routed to a geographically removed location and IP addresses need to be managed between the two data centers.

Each of these long distance challenges—WAN constraints and user connection management—become more of an issue with "sticky apps," applications that have a very intensive user experience, such as web 2.0 applications.

Connecting Clouds with Traffic Management Device Solutions

To address the difficulties inherent in migrating an application to the cloud automatically and seamlessly, applicants present embodiments that optimize, secure, and manage VM migration and user connections between data centers, effectively "connecting clouds." Beyond network optimizations and security, transitioning user connections from one cloud to another is an important consideration in moving VMs between data centers. User experience is enhanced if the application does not suffer any significant downtime or loss of application data during or after a cross-site live migration.

Building a Successful Data Center-to-Cloud Network

In designing solutions for long distance migration, applicants created methods, computer-readable media, and systems that enable secure live migrations between multiple cloud-based data centers without any interruption in the application service or user downtime.

Figure 2:
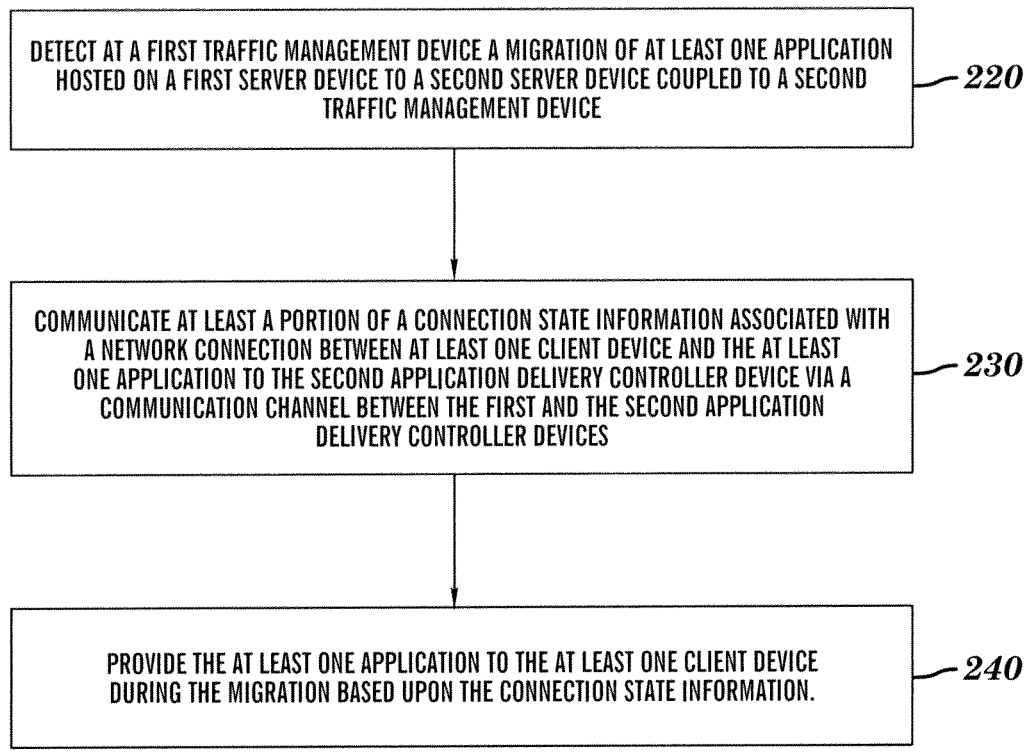
FIG. 2 is a flowchart illustrating exemplary steps for a method for preserving flow state.

Referring to FIG. 2, an exemplary method for providing flow state preservation in the traffic management device of FIGS. 1A-1B is illustrated. In step 220, at a first traffic management device, a migration of at least one application hosted on a first server device to a second server device coupled to a second traffic management device is detected. In step 230, at least a portion of a connection state information associated with a network connection is communicated between at least one client device and the at least one application to the second traffic management device via a communication channel between the first and the second traffic management devices. In step 240, the at least one application is provided to the at least one client device during the migration based upon the connection state information.

Figure 3A:
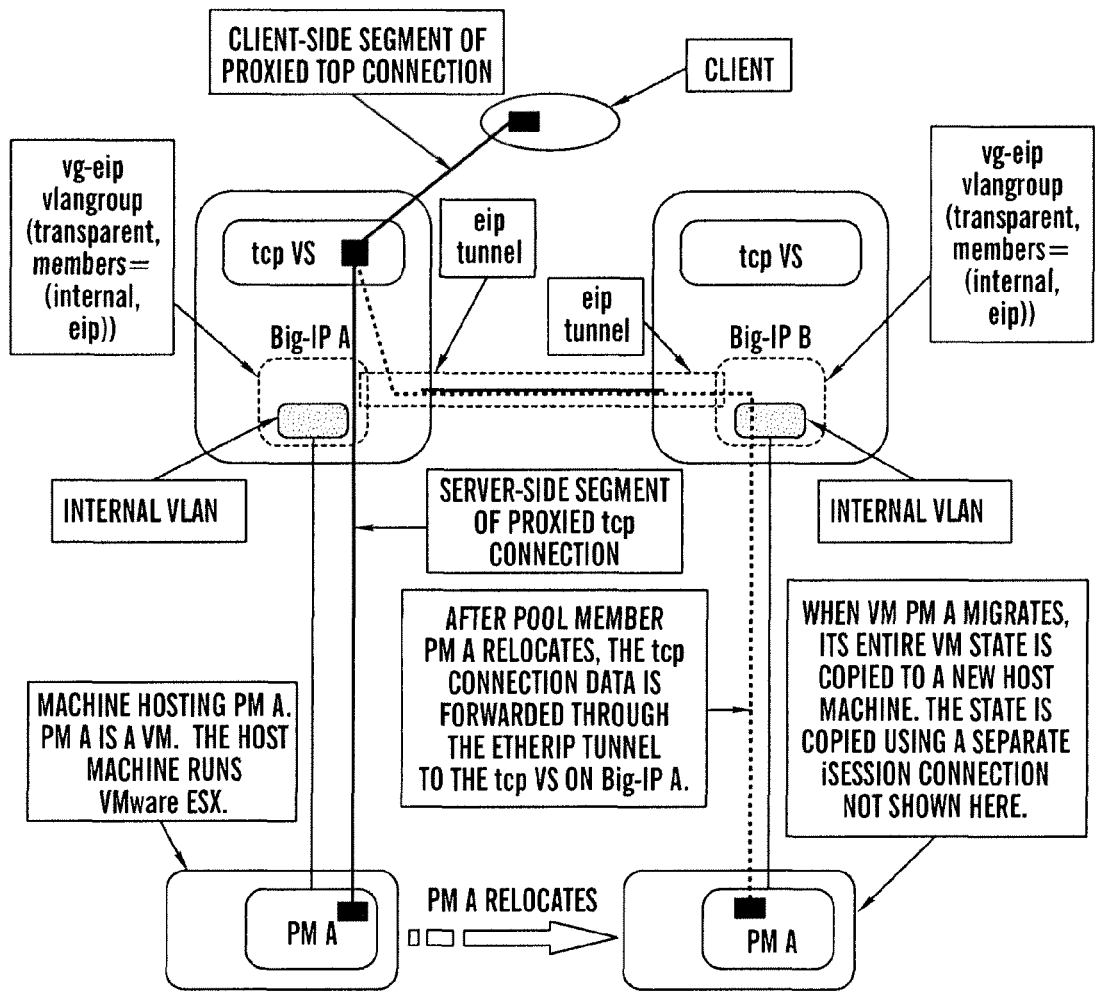
FIGS. 3A and 3B illustrate exemplary migration scenarios.
Figure 3B:
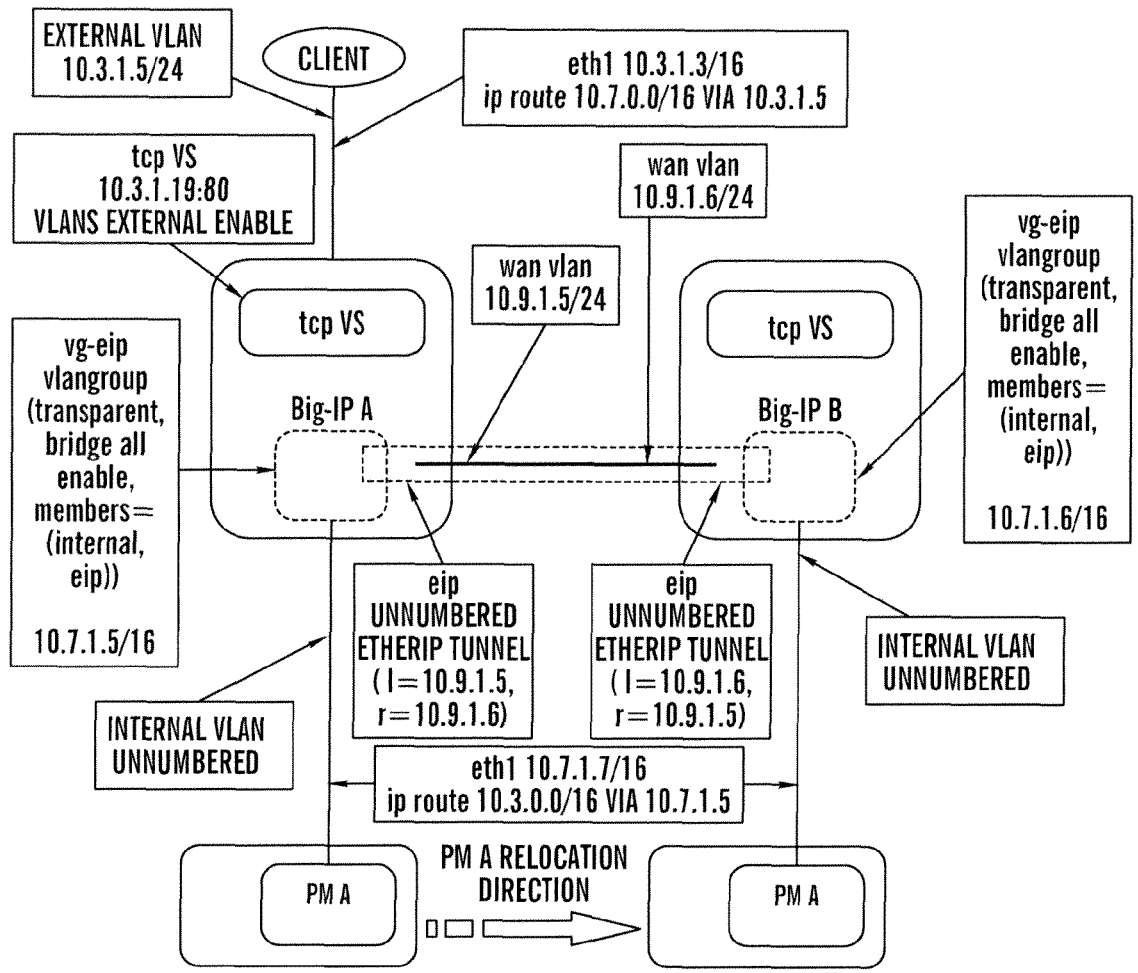
Figure 4:
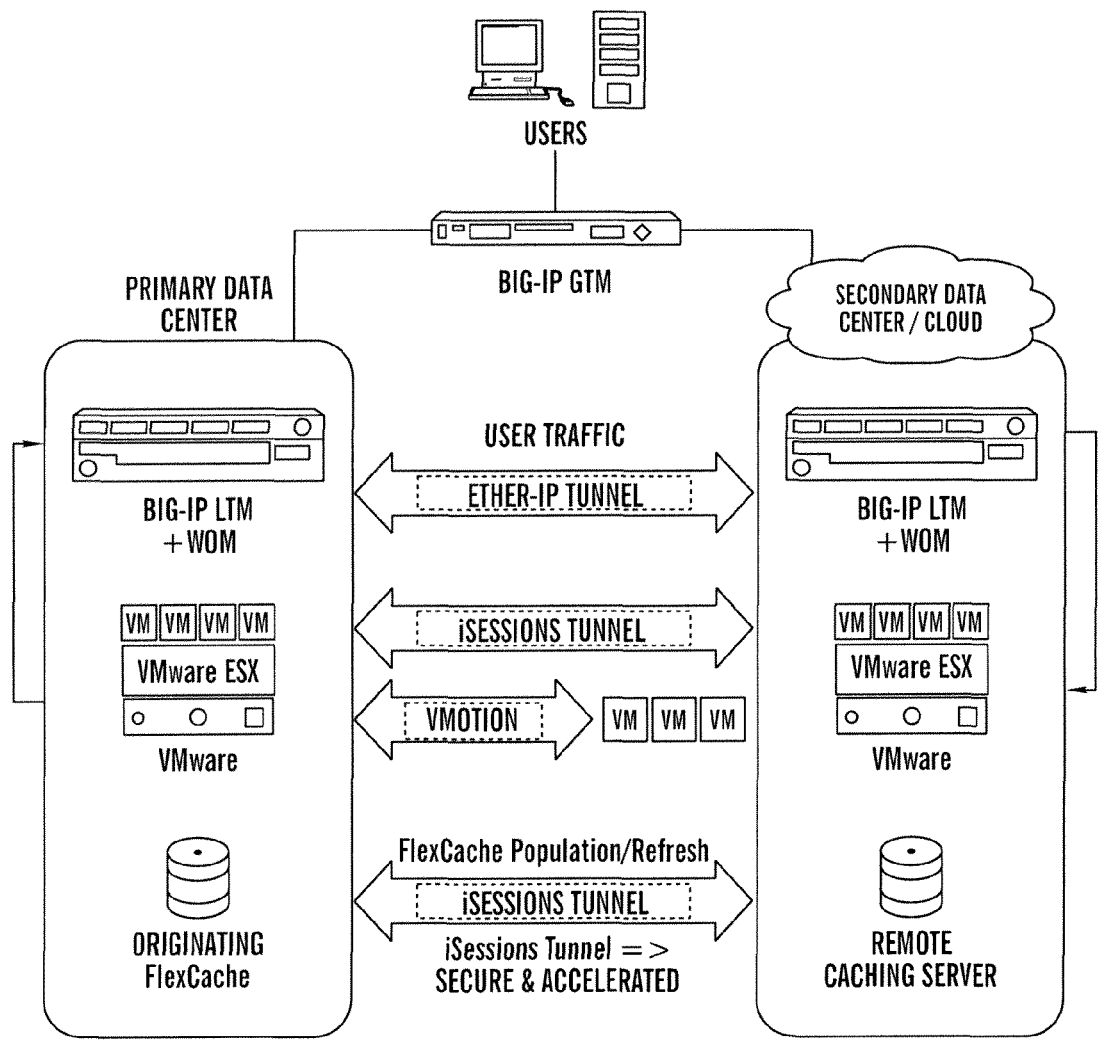
FIG. 4 is an exemplary testing scenario.

Until now, a latency period of around 6-7 seconds may be introduced during migration of a virtual machine application from one server in a first datacenter site to a second server in a second datacenter site. Exemplary embodiments provide movement of connection state between the two "independent" traffic management devices (e.g., application delivery controllers (ADCs)), depicted as 310 and 310' in FIG. 3A. Neither ADC shares any configuration or state with the other. Rather, each ADC only knows of its tunnel endpoint peer. A tunnel endpoint peer may include an ADC or any device capable of terminating an EtherIP tunnel. All traffic that previously existed on a virtual machine (VM) before a migration event is returned back to the original ADC for processing. In one embodiment, this can be done by software network address translation (SNAT) for all the traffic through the ADC so that the connections appear to originate from the ADC. The VM merely returns all traffic to ADC A's MAC/selfIP after the migration event.

This is, however, a limitation that not all customers could handle. It would be desirable for the traffic to appear to come from the originating clients. That requires that the VM be configured with a default route that points back to the ADC. But which one, ADC A (e.g., 310) or ADC B (e.g., 310')? The VM's configuration can not be changed as part of the migration event, as that is the point of the migration. Thus, in some embodiments, an IP address is shared between both ADCs, each of which is capable of responding to address resolution protocol (ARP) queries to that address on the Ethernet segment of the VLAN group, but not the tunnel segment (as this would result in ARP conflict messages on each ADC seeing the other's gratuitous ARPs). In this way, the handling of external client addresses is addressed.

If, on failover, ADC B does not have a connection to handle the traffic itself, it should bridge the traffic over the tunnel to its peer. However, this fails because the MAC address of the peer ADC is not the one the VM may use. If ADC B issues a gratuitous ARP for the shared IP address, or should the ARP cache of the VM expire, then the MAC address of ADC B would be used for the default route, leaving ADC B to handle the unknown traffic.

In some embodiments, this problem and that of VIP bounceback (allowing the VM's to use VIP's defined on the ADC) is addressed by duplicating the configuration on both ADC's, same bounceback VIP's same IP address for the default route address, enabled on only the ethernet segment. But, once a migration event is detected (via the movement of the MAC address of the VM from the Ethernet segment to the tunnel segment), ADC A immediately forwards its connection table for that VM to ADC B. In addition, ADC B may not handle any unknown traffic (e.g., any traffic that does not already have a connection entry in ADC B) from the VM until ADC A has completed sending over its connection table.

But there is no connection or protocol established between the ADCs to accomplish this. So, in some embodiments, ADC A sweeps its connection table sending TCP keepalive frames or UDP datagrams with no payload over the time period (approximately 6.4 seconds) required to sweep the table. These generate L2 forwarding entries on ADC B. ADC B stops handling new/unknown traffic from the VM (though not from ADC A) for ~7 seconds. Once this time period is complete, the harmless keep-alive frames have established all the connections on ADC A as L2 forwarding entries on ADC B. ADC B will now forward all these existing connections back to ADC A, even if the MAC address that the VM uses for sending the traffic is that of ADC B. Any new connections are now handled by ADC B. This allows it to service all new connection from the VM using resources local to ADC B.

The use of TCP keep-alive and UDP zero payload frames to populate a remote connection table is novel. The use of any non-invasive TCP frame (bad checksum, sequence number out of range, etc.) could be substituted for the keep-alive frame; equally a bad checksum UDP frame or equally non-evasive UDP frame could be used for the UDP zero payload frame.

Simultaneously, there is a notification to a global traffic manager device (GTM) of the transition so that the GTM can direct new connections to the new datacenter. When a pool contains several members, a subset of the members is moved to the other datacenter and the GTM can direct the appropriate portion of new connections to the new datacenter.

A second feature is an enhancement to allow the setting of VScore on a triggered event so that once the node moves to the remote datacenter, the local traffic manager (LTM) in a first datacenter could effectively mark the node as "down" via GTM so new connections would be directed to a second datacenter even though the node is still accessible through the first datacenter. Existing data connections to/from the virtual machine from outside the ADC will be preserved on transition to the other datacenter.

Existing outbound connections originated from/to an ADC as well as to other devices connected to the same LAN segment (VIP traffic, VIP bounceback traffic, direct connections to other nodes, outbound traffic to the internet, etc.). In some embodiments, this may be required to work with single and redundant ADCs in either one or two datacenters, and optionally work with a minimum of 2 datacenters.

In some embodiments, when a live virtual machine has come up in its new home, packets associated with existing long-lived connections will be forwarded to it from the ADC fronting its old home. Outbound traffic is properly routed.

Applicants have accomplished exemplary embodiments using tools and technologies that plug into VMware's vCenter™ for VM application networking management including but not limited to: F5's BIG-IP® Local Traffic Manager™ (LTM), BIG-IP® Global Traffic Manager™ (GTM), BIG-IP® integrated WAN optimization services, iSessionsTM tunneling between data centers, and iControl®, the open API used to manage the migration through vCenter.

Details of various examples of a migration of a virtual machine application from a datacenter site 100 to a datacenter site 100' are provided below.

Example Step-by-Step Solution Walkthrough 1. iSessions Tunnel

In one embodiment, a first step in building an infrastructure to support secure live migration between clouds and data centers is to symmetrically connect each data center—e.g., by using a feature of F5's BIG-IP LTM, iSessions tunnels, or through any other suitable means. Using SSL and advanced data compression techniques, BIG-IP LTM creates optimized tunnels between each data center to carry the VMotion traffic. This enables applications within each data center to communicate efficiently over the private connection and creates the infrastructure to support the storage and VM migrations.

2. Storage VMotion

Once the iSessions (or any other suitable) infrastructure is in place, initiating a Storage VMotion event is a first step in actually moving the VM from one data center to the other. Different trigger mechanisms are possible (e.g. VMware vCenter Orchestrator™); however, ultimately vCenter will trigger a Storage VMotion event and begin migrating the virtual disks between the primary and secondary data centers. All application traffic will continue to flow to the VM located in the primary data center, and vCenter in that data center will still retain control over the VMs tied to the Storage VMotion event. The storage data is passed through the optimized iSessions tunnel over the WAN connection.

3. VM VMotion

Once the Storage VMotion event finishes, vCenter in the primary data center will trigger a standard VMotion event to move the running VM to the secondary data center. VMotion will be moving the VM over the iSessions tunnel to an ESX server located in the secondary data center which, due to the iSessions tunnel, is part of the same network as the primary data center. During the migration event, vCenter at the primary data center will remain in control of the transplanted VM.

4. Data Center Connection Redirection

After successful completion of the VMotion migration event to the secondary data center, BIG-IP LTM at the secondary data center will recognize that the application is up and available. BIG-IP LTM at the primary data center will start routing existing connections through the iSessions tunnel to the VM now running at the secondary data center. BIG-IP GTM will also begin sending any new connections directly to the migrated VM in the secondary data center. As the existing user connections naturally terminate, all application traffic will be routed natively to the secondary data center.

5. vCenter VM Re-Registration

After the migrated VM is up and running in the secondary data center and all application traffic is being routed to that machine, BIG-IP LTM will send an instruction to the vCenter consoles at both data centers, turning over VM management to vCenter in the secondary data center. vCenter in the primary data center will stop managing the migrated VM, thus completing the long-distance VMotion event. The entire VM bundle, from storage up through management, is now live and serving users out of the secondary data center, and the VM in the primary data center can be shut down.

6. IP Reclamation

In the event of a one-way move where the VMotion migration is a more permanent relocation, the original IP space for the VM in the primary data center can be reclaimed and reused for other applications. Once the migration is complete—vCenter in the secondary data center has assumed control of the VM and all user connections are being routed to the secondary data center—the IP addresses in the primary data center (both local/internal and external) can be reclaimed and reused for other applications.

Exemplary Use Cases—Live Migration/Virtual Location

For each exemplary use case, the base setup is largely the same:

Infrastructure Setup

Equipment: Two ESX servers; a WAN emulation device (LANForge); two ADCs running iSessions; Shared storage; Vcenter Client running on windows.

The ESX servers may be configured to have a VMKernel Port for VMotion. This VMkernel port, on an ESX virtual switch, may be bound to a unique physical adapter. Configuration may be set as follows:

Each ESX server may have a shared stored device mounted via iSCSI or NFS that both ESX servers can mount. Thus, for testing, storage does not become a gating factor.

Figure 5:
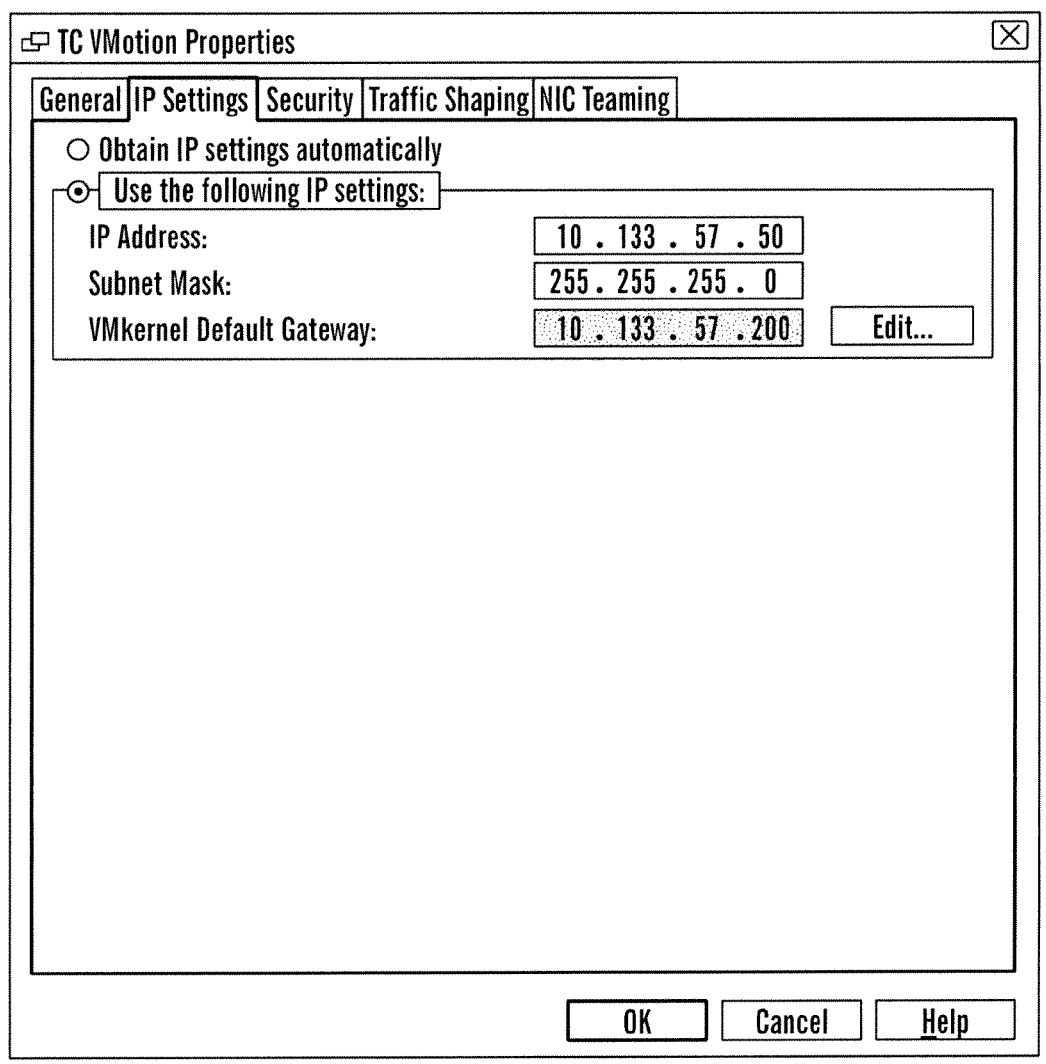
FIG. 5 is a screenshot of VMotion IP settings.

Referring to FIG. 5, the VMkernel Default Gateway for VMotion, under "IP Settings," may point to a self-IP on one of the ADCs. The IP address and Subnet mask may be changed as appropriate. The second ESX server may have the identical VMKernel setup; however, the IP Address, Subnet Mask and Gateway may be on a different network.

Figure 6:
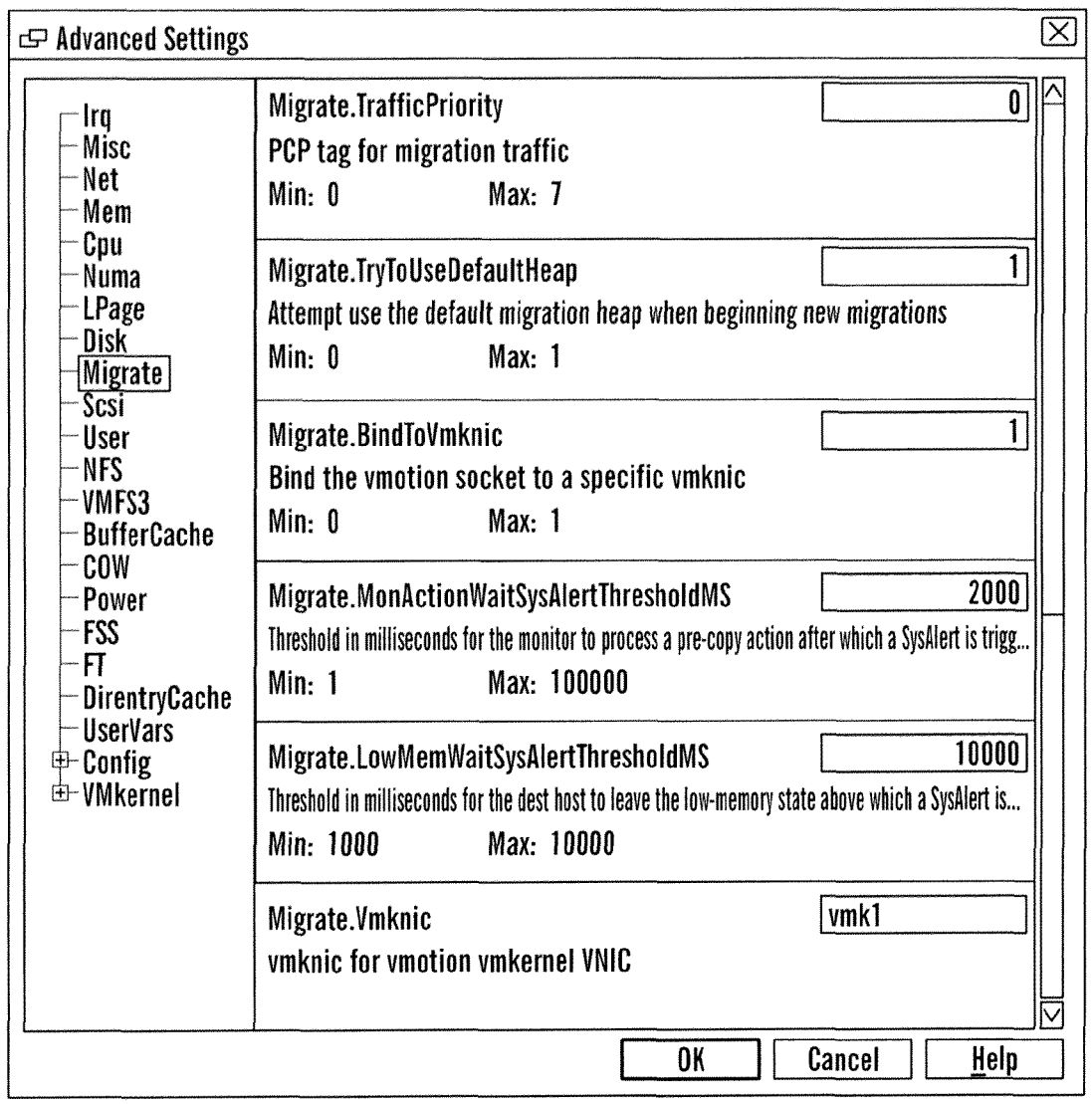
FIG. 6 is a screenshot of a VMware ESX server configuration tool.

Referring to FIG. 6, The ESX server may be configured via Advanced settings to bind to a specific vmknic. Configuring may include selecting the ESX server within the vSphere Client; selecting the "Configuration" tab; selecting Software Advanced Settings; selecting the Migrate feature; and then changing the "Migrate.BindToVmknic" to a value of "1".

The traffic management device configuration may have an iSession optimization policy that captures network traffic bound for the remote network, on TCP port 8000. In some embodiments, with Equinox releases, the following settings for iSession are particularly reliable:

Symmetric de-duplication off.

Adaptive compression on.

SSL may be on or off. Migrations using SSL take, on average, 50% longer than migrations over iSessions without SSL.

The Lanforge configuration may test one of the common anticipated scenarios. In one embodiment, applicants recommend:

Speed T3—45 Mbps symmetric;
40 ms RTT latency;
0% packet loss.

Testing Flow

For exemplary test scenarios, there are a common flow of procedures. An exemplary flow is as follows:

1. A "decision" is made, through automation or orchestration, etc., to move a hose from one "datacenter" to another. In one exemplary testing scenario, the recommendation is to either migrate a running machine via the vSphere Client by right clicking on the machine and selecting "migrate", or by using automation via Perl API that PME has tested.

2. Once the migration is started, VMWare will begin calculations on the migration and start the process over the tunnel.

3. While this is happening traffic may be contacting listeners on the given machine being migrated.

4. The goal is to have as little or no user interruption as possible during and after the movement. The types of traffic that may be tested and their patterns are detailed in the Traffic Use cases below.

Traffic Use Cases

While VMotion traffic goes over an iSession tunnel, the client traffic will go over the new EIP tunnel. The assumption here is that the exemplary testing flow steps 1 to 4 described above have been completed. Memory has been migrated and completed or is just about to complete. The machine will now be responding in datacenter 2, and VMware will send out a series of gratuitous ARPs.

Monitor use case #1—Monitor detects that the virtual machine (guest) is no longer responding on ADC in datacenter 1.

Exemplary Requirements on ADC

A VMotion pool containing 10 guest servers.

A GTM with two datacenters.

The live motion monitor has been applied.

Expected Behavior—Depending on Setup, (Dynamic Ratio or Not)

When five of the machines have migrate, the dynamic ratio may, for example, be 50%. Machines may be able to be moved to Datacenter 2 and back to Datacenter 1, without issues with the monitor.

Use Case for a Typical Web Layer Application #1—New Connections Coming into a Web Server Exemplary Requirements A web server such as Apache or IIS.

A client capable of making requests.

Expected Behavior

Stateless new connections are coming into a web server, requesting various pages. After the migration is complete, even with GTM updated, some traffic will continue to come to Datacenter 1. Test that these connections make it to Datacenter 2 and are not impacted by the migration. Eventually DNS will resolve these issues and further new connections will go to Datacenter 2.

Use Case for a Typical Web Layer Application #2—Established Connections on an Existing Web Server Exemplary Requirements A web server such as Apache or IIS; alternatively or additionally FTP, SSH or other long-lived connection. The more connection types tested the better.

A client capable of making requests in the given protocol. For example, web or FTP or SSH, etc.

If using HTTP, a CGI or similar upload library (PHP upload for example).

Expected Behavior

A connection is established to a server that will be migrated, for example: A large file is downloaded or uploaded, via HTTP; a large file is downloaded or uploaded, via FTP; a large file is downloaded or upload, via SCP; a connection is established via SSH and someone runs "TOP" or runs some interactive application.

After the migration is complete, the machine will come up in Datacenter 2 with the same memory state. Test that these connections make it to Datacenter 2 and are not impacted by the migration: Do the downloads or uploads continue? Is the SSH connection still established?

Use Cases for Typical Application Layer #1—New Connections Between a Webserver and an Appserver
  Exemplary Requirements
  A webserver such as Apache or IIS.
  An application server on a separate VMotion guest such as Tomcat or Weblogic.
  A connector between Apache, IIS and Tomcat or Weblogic such as mod_jk. Tomcat documentation is located at: http://tomcat.apache.org/connectors-doc/
  A client capable of making requests to the webserver/app server.
  Sample content/JSP on Tomcat that indicates the hostname or some other "test page."
  Expected Behavior
  The webserver is a proxy layer and HTTP engine for the application server. Connections come into the webserver. Using the configuration file, the webserver proxies the request to the application server. These connections may be short-lived so that every connection is new, or they may be long-lived. Initiate VMotion on either the application layer or the Web layer. Test that the connections make it back to other layer, as appropriate, without any loss.
Use Cases for Typical Application Layer #2—New Connections Between a Appserver/Webserver and an Database
  Exemplary Requirements
  A webserver such as Apache or IIS.
  An application server on the same or separate VMotion guest such as Tomcat or Weblogic or PHP.
  A database such as MySQL, Postgres, Oracle or any similarly suitable database.
  A client capable of making requests to the webserver/app server.
  Sample content/JSP on tomcat that indicates the hostname or some other "test page."
  Sample content in the database. Content management systems such a Drupal make extensive use of database reads in PHO and would be a good candidate for easy, free sample content.
  Expected Behavior
  The webserver or appserver, such as PHP, is configured to get its information from a database. Initiate VMotion on either the application layer or the database layer. Test that the connections make it back to other layer, as appropriate, without any loss.

Conclusion

VMware has changed the way data centers are built, and cloud computing is changing how to think about local and remote data centers. Moving applications and running servers between hardware platforms enables us to create a very fluid and agile IT infrastructure to support new business needs. Yet these solutions are not seamless out of the box and often don't factor in the application needs and user experience.

Not only do the embodiments described above enable long distance VMotion events from cloud to cloud, but the same solution can be deployed within the local data center to migrate running VMs from one physical network to another physical network (assuming the VM network configuration remains unaltered). This solution can help move VMs from the development/staging network into production, or move a running VM between security zones such as the DMZ and the private network.

Regardless of whether one uses F5 BIG-IP solutions to manage VMotion events within the data center, between private clouds, or between private and public clouds, the application delivery technology remains the same. iSessions keeps the data secure in transit and optimizes the WAN for accelerated and reliable delivery of the storage and VM data. The VMware API enables ADC solutions to request re-registration of the migrated VMs within vCenter in the destination cloud or data center. BIG-IP LTM and BIG-IP GTM manage user connections to the application to ensure that no user data is lost and that the applications remain online and available.

This integrated solution enables long distance VMotion for the first time between data centers and clouds. The solution works with existing networks and IT infrastructure; it does not require a re-architecture of local or remote networks. In various embodiments, this seamless solution uses existing technologies from both F5 and VMware to enable transparent live VM migration over long distances, guaranteeing the applications are migrated in an optimized manner and always remain available before, during, and after the VMotion migration. Moving applications and services transparently between clouds is now possible.

Accordingly, a mechanism supporting live VM migration from one VM host system to another, across distinct DCs while ensuring that traffic for host data connections is forwarded to the appropriate host server is provided. After the migration of a live VM to its new home, there is a need to start forwarding packets for existing long lived connections from the ADC at the old DC to the ADC at the new DC.

Flow state is preserved across VM migrations by manipulating internal Traffic Management Module (TMM) inside traffic management device state as described above and in FIG. 3A. The system environment includes a first LAN with a first ADC managing a first server set containing one or more virtual server machines and a second LAN with a second ADC managing a second server set containing one or more virtual server machines where both LANs are separated by a WAN. There is also an L2 tunnel established between the first and second ADCs over the WAN. A server set member virtual server machine in the first LAN is taken down and moved over to the second LAN. When that happens, upon the new server set member virtual server machine in the second LAN waking up, it sends out a gratuitous ARP (GARP), which is received by the second ADC and transmitted to the first ADC so it can update its state tables. Existing data flows involving the migrated server set member virtual server machine from the first LAN are forwarded to the second ADC in the second LAN across the L2 tunnel New connections involving the newly spun up server set member virtual server machine in the second LAN are established over the second ADC as they would normally with any server in a ADC managed LAN.

In some embodiments, traffic management device 110 detects a latency of network traffic to the second server device during the migration (e.g., traffic latency on the WAN). Based on this detection, the traffic management device 110 may subsequently broadcast or advertise its traffic capabilities on the LAN to the virtual machine application. The traffic management device 110 may remove the unwanted effects of such WAN latency by terminating at least a portion of traffic between traffic management device 110 and the virtual machine application, based at least in part upon the detected latency and/or the traffic management device's advertised capabilities.

For example, BIG-IP may allow the virtualization platform (e.g., VMware ESX) to terminate VMotion traffic locally (e.g., on the near-side BIG-IP), thereby allowing the virtualization platform to detect normal LAN bandwidths and latency. VMotion may otherwise be highly susceptible to variances in latency and may have filters in place to fail VMotion events (both memory and storage) in such cases of variable latency. It is BIG-IP's inherent full-proxy capability that allows VMotion to be shielded from the variances of WAN latency, thereby allowing VMotion to be successful over the WAN.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks using different types of traffic management devices may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the processes to any order.

What is claimed is:

1. A method for preserving network flow state, the method comprising:
    detecting by a first traffic management computing device a migration of at least one application hosted on a first server device coupled to the first traffic management computing device to a second server device coupled to a second traffic management computing device, wherein the detecting further comprises detecting any latency of network traffic between the first server device and the second server device during the migration;
    communicating by the first traffic management computing device connection state information associated with a network connection between at least one client device and the at least one application to the second traffic management computing device via a communication channel between the first and the second traffic management computing devices;
    receiving by the first traffic management computing device at least one address resolution protocol packet from the second traffic management computing device and one or more network packets destined for the at least one client device, associated with the network connection, and originating from the at least one application from the second traffic management computing device after the migration, wherein the receiving comprises terminating at least a portion of the network traffic between the first server device and the second server device when the detected latency of network traffic is greater than a first threshold latency; and
    sending subsequent inbound requests from the at least one client device and associated with the network connection using network address information included in the at least one address resolution protocol packet.

2. The method as set forth in claim 1, wherein the at least one application is a virtual machine application, and wherein the communication channel is an at least partly secure communication channel.

3. The method as set forth in claim 1, wherein the connection state information is communicated using one or more non-invasive connection state packets comprising transmission control protocol (TCP) keep-alive packets or non-invasive user datagram protocol (UDP) packets including empty UDP packets.

4. The method as set forth in claim 1, wherein the first traffic management computing device is a part of a first physical network and the second traffic management computing device is a part of a second physical network separate from the first physical network.

5. The method as set forth in claim 1 further comprising redirecting by the first traffic management computing device a new connection request from the at least one client device after the migration of the at least one application to the second traffic management computing device.

6. The method as set forth in claim 1 further comprising notifying by the first traffic management computing device a global traffic management computing device of the migration.

7. The method as set forth in claim 1, wherein the communication channel is an Ethernet communication channel.

8. The method as set forth in claim 1, wherein the detecting, the communicating, the providing, and the receiving are carried out for subsequent one or more migrations of the at least one application to at least one additional traffic management computing device.

9. The method as set forth in claim 1 further comprising monitoring by the first traffic management computing device network traffic to the second server device during the migration for allocating resources at the second server device for the at least one application.

10. A non-transitory computer readable medium having stored thereon instructions for preserving network flow state comprising machine executable code which when executed by at least one processor, causes the processor to perform steps comprising:
    detecting a migration of at least one application hosted on a first server device coupled to a first traffic management computing device to a second server device coupled to a second traffic management computing device, wherein the detecting comprises detecting any latency of network traffic between the first server device and the second server device during the migration;
    communicating at least a portion of connection state information associated with a network connection between at least one client device and the at least one application to the second traffic management computing device via a communication channel between the first and the second traffic management computing devices; and
    receiving at least one address resolution protocol packet from the second traffic management computing device and one or more network packets destined for the at least one client device, associated with the network connection, and originating from the at least one application from the second traffic management computing device after the migration, wherein the receiving comprises terminating at least a portion of the network traffic between the first server device and the second server device when the detected latency of network traffic is greater than a first threshold latency; and
    sending subsequent inbound requests from the at least one client device and associated with the network connection using network address information included in the at least one address resolution protocol packet.

11. The medium as set forth in claim 10, wherein the at least one application is a virtual machine application, and wherein the communication channel is an at least partly secure communication channel.

12. The medium as set forth in claim 10, wherein the connection state information is communicated using one or more non-invasive connection state packets comprising transmission control protocol (TCP) keep-alive packets or non-invasive user datagram protocol (UDP) packets including empty UDP packets.

13. The medium as set forth in claim 10, wherein after the migration, the at least one application is configured to transmit at least one network packet frame, associated with a virtual image of network sites where the first and the second traffic management computing devices are located, to the second traffic management computing device that forwards at least one address resolution protocol packet to the first traffic management computing device for handling subsequent inbound requests from the at least one client device, wherein the at least one network packet frame comprises one or more of an Ethernet frame including an address resolution protocol packet and an IP frame.

14. The medium as set forth in claim 10, wherein the first traffic management computing device is a part of a first physical network and the second traffic management computing device is a part of a second physical network separate from the first physical network.

15. The medium as set forth in claim 10 further comprising redirecting a new connection request from the at least one client device after the migration of the at least one application to the second traffic management computing device.

16. The medium as set forth in claim 10 further comprising notifying a global traffic management computing device of the migration.

17. The medium as set forth in claim 10, wherein the communication channel is an Ethernet communication channel.

18. The medium as set forth in claim 10, wherein the detecting, the communicating, the providing, and the receiving are carried out for subsequent one or more migrations of the at least one application to at least one additional traffic management computing device.

19. The medium as set forth in claim 10 further comprising monitoring network traffic to the second server device during the migration for allocating resources at the second server device for the at least one application.

20. A traffic management computing device comprising:
one or more processors;
a memory coupled to the one or more processors;
a network interface unit coupled to the one or more processors and the memory via at least one bus, at least one of the network interface unit configured to implement or the one or more processors configured to execute programmed instructions stored in the memory comprising:
detecting a migration of at least one application hosted on a first server device coupled to the traffic management computing device to a second server device coupled to a second traffic management computing device, wherein the detecting comprises detecting any latency of network traffic between the first server device and the second server device during the migration;
communicating at least a portion of connection state information associated with a network connection between at least one client device and the at least one application to the second traffic management computing device via a communication channel between the traffic management computing device and the second traffic management computing device; and
receiving at least one address resolution protocol packet from the second traffic management computing device and one or more network packets destined for the at least one client device, associated with the network connection, and originating from the at least one application from the second traffic management computing device after the migration, wherein the receiving comprises terminating at least a portion of the network traffic between the first server device and the second server device when the detected latency of network traffic is greater than a first threshold latency; and
sending subsequent inbound requests from the at least one client device and associated with the network connection using network address information included in the at least one address resolution protocol packet.

21. The traffic management computing device as set forth in claim 20, wherein the at least one application is a virtual machine application, and wherein the communication channel is an at least partly secure communication channel.

22. The traffic management computing device as set forth in claim 20, wherein the connection state information is communicated using one or more non-invasive connection state packets comprising transmission control protocol (TCP) keep-alive packets or non-invasive user datagram protocol (UDP) packets including empty UDP packets.

23. The traffic management computing device as set forth in claim 20, wherein after the migration, the at least one application is configured to transmit at least one network packet frame, associated with a virtual image of network sites where the first and the second traffic management computing devices are located, to the second traffic management computing device that forwards at least one address resolution protocol packet to the first traffic management computing device for handling subsequent inbound requests from the at least one client device, wherein the at least one network packet frame comprises one or more of an Ethernet frame including an address resolution protocol packet and an IP frame.

24. The traffic management computing device as set forth in claim 20, wherein the first traffic management computing device is a part of a first physical network and the second traffic management computing device is a part of a second physical network separate from the first physical network.

25. The traffic management computing device as set forth in claim 20 further comprising redirecting a new connection request from the at least one client device after the migration of the at least one application to the second traffic management computing device.

26. The traffic management computing device as set forth in claim 20 further comprising notifying a global traffic management computing device of the migration.

27. The traffic management computing device as set forth in claim 20, wherein the communication channel is an Ethernet communication channel.

28. The traffic management computing device as set forth in claim 20, wherein the detecting, the communicating, the providing, and the receiving are carried out for subsequent one or more migrations of the at least one application to at least one additional traffic management computing device.

29. The traffic management computing device as set forth in claim 20 further comprising monitoring network traffic to the second server device during the migration for allocating resources at the second server device for the at least one application.

* * * * *